United States Patent [19]
Taniguchi et al.

[11] Patent Number: 5,653,516
[45] Date of Patent: Aug. 5, 1997

[54] ANTISKID CONTROL BASED ON DETECTED COEFFICIENT OF FRICTION

[75] Inventors: Masahiko Taniguchi, Anjou; Kazuya Maki; Takashi Watanabe, both of Nagoya; Junji Mizutani, Oobu, all of Japan

[73] Assignee: Nippondenso Co., Ltd., Kariya, Japan

[21] Appl. No.: 475,496

[22] Filed: Jun. 7, 1995

[30] Foreign Application Priority Data

Jun. 13, 1994 [JP] Japan .................. 6-130690

[51] Int. Cl.⁶ .................. B60T 8/58
[52] U.S. Cl. .................. 303/150; 303/176
[58] Field of Search .................. 303/149, 150, 303/157, 158, 159, 163, 176; 364/426.02

[56] References Cited

U.S. PATENT DOCUMENTS 4,881,784  11/1989  Leppek .................. 303/149 X
5,092,662   3/1992  Okubo .................. 303/150

FOREIGN PATENT DOCUMENTS 6090755  7/1981  Japan .................. 303/150
 516782  1/1993  Japan .

*Primary Examiner*—Peter M. Poon
*Attorney, Agent, or Firm*—Cushman, Darby & Cushman IP Group of Pillsbury Madison & Sutro LLP

[57] ABSTRACT

An antiskid control system executes a modified antiskid control which strengthens the tendency of the wheel to lock if a vehicle speed is under a predetermined speed and the vehicle is running on a road which has a low coefficient of friction. Antiskid control is also modified with respect to front wheels and is normal with respect to rear wheels in order to avoid an occurrence of vehicle spin. Further, antiskid control is modified with respect to either a front right wheel or a front left wheel. As a result, a stopping distance of the vehicle can be shortened while securing the steering stability of the vehicle.

36 Claims, 7 Drawing Sheets

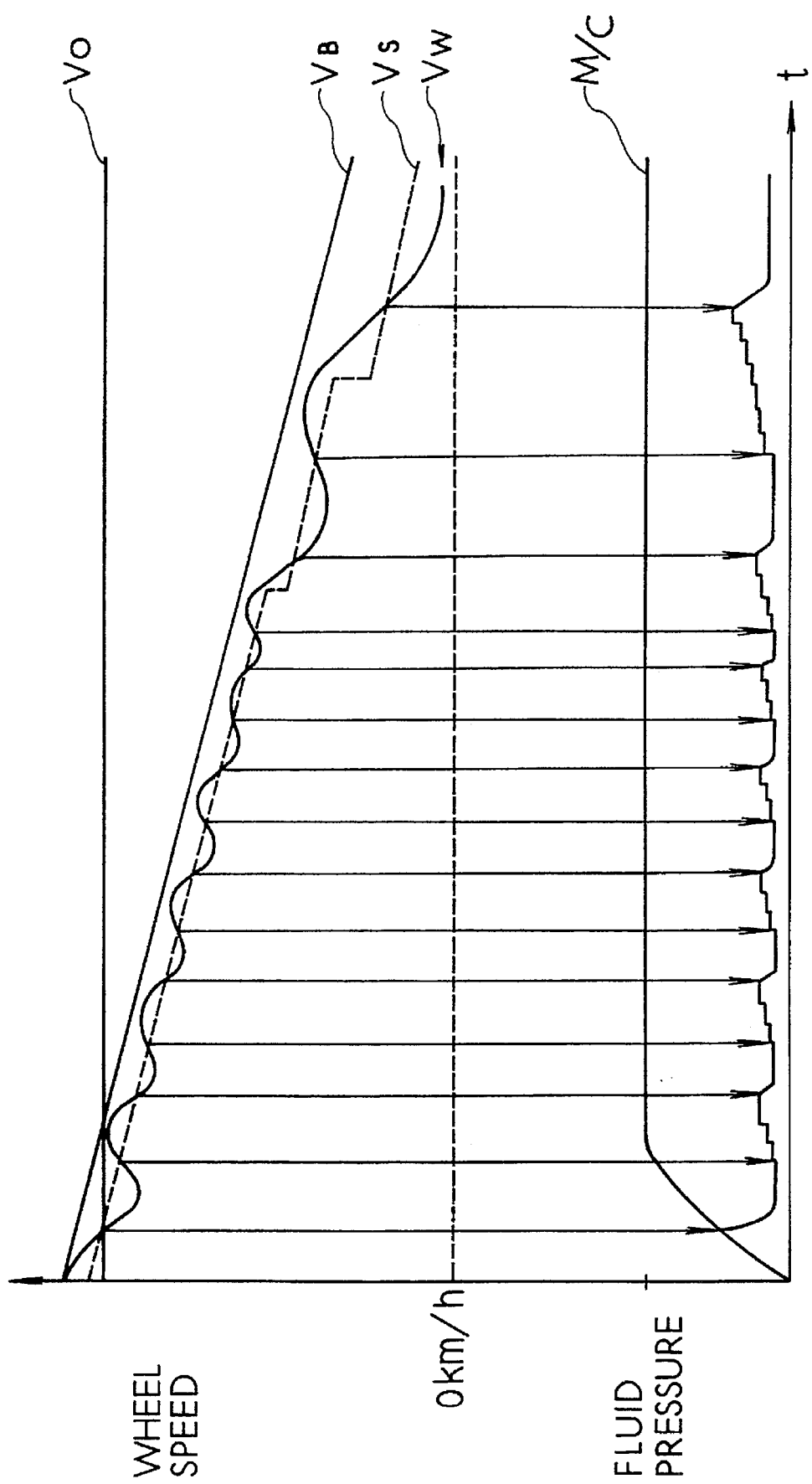

ANTISKID CONTROL BASED ON DETECTED COEFFICIENT OF FRICTION

CROSS REFERENCE TO RELATED APPLICATION

This application is based upon and claims priority from Japanese Patent application No. Hei. 6-130690 filed Jun. 13, 1994, the contents of which are incorporated herein by reference.

BACKGROUND OF THE INVENTION

1. Field of the Invention

The present invention generally relates to an automotive antiskid control system.

2. Related Art

An antiskid control system has been widely known. The antiskid control system can shorten the stopping distance of a vehicle by starting the adjustment of brake pressure on condition that the slip ratio of each wheel exceeds a target slip ratio (approximately 20%) in order to maintain the slip ratio of each wheel to the target slip ratio.

Among all of the conventional antiskid control systems Japanese Unexamined Patent Publication No. Hei. 5-16782, discloses that, when a vehicle is running on a road having a friction coefficient below a predetermined value (i.e., low μ road), the control characteristic with respect to the brake pressure of a wheel at low speed is established so as to weaken a wheel locking tendency as compared to a vehicle running over middle range of speeds. This is because the above system aims for exactly preventing the locking of the wheel so that the vehicle attitude and course can effectively be controlled by operating a steering wheel during the stopping period of time, in view of the fact that the time required to stop the vehicle on the low μ road becomes long.

Since vehicles employing spike-less snow tires are increasing in recent years, there are an increasing number of "mottled road surfaces" particularly around urban crossings where an ice part and a dry asphalt part alternatingly appear. If antiskid control is executed while a vehicle is running on the "mottled road surface," the slip ratio of a wheel increases when the wheel passes over the ice part as illustrated in FIG. 10. Therefore, the brake pressure is reduced and the deceleration of the wheel sharply falls. Subsequently, when the wheel passes over the dry asphalt part, the brake pressure is gradually increased and thereby the deceleration of the wheel rises. However, while the reduction of the brake pressure is sharply performed, the increase of the brake pressure is only gradually performed. Consequently, the wheel reaches the next ice part before the deceleration thereof sufficiently rises and then the brake pressure is sharply reduced again. For this reason, the stopping distance of the vehicle becomes longer compared with a case where the wheel is locked without executing the antiskid control. Particularly, the antiskid control according to the above prior art controls the brake pressure so that the locking tendency is weakened when the vehicle is running at low speed on the low μ road. Therefore, there is a problem that the deceleration of the vehicle further falls and thus the stopping distance thereof becomes considerably long.

On the other hand, seeing dry asphalt parts on the road surface, a driver expects a vehicle speed to be decelerated on the dry asphalt part. For this reason, the driver tends to depress a brake pedal stronger than usual on the "mottled road surface." However, as described above, the brake pressure is sharply reduced on the ice part according to the conventional antiskid control system, the deceleration is not realized so as to satisfy the driver's expectations but gives a sense of dissatisfaction to the driver.

As described above, most low μ roads are composed of the above "mottled road surface" in urban areas. Therefore, there is a problem that the conventional antiskid control system cannot satisfy the expectation of the driver with respect to the deceleration and cannot sufficiently shorten the stopping distance of the vehicle, either.

SUMMARY OF THE INVENTION

Accordingly, it is an object of the present invention to satisfy the expectation of the driver with respect to the deceleration on the above "mottled road surface" and concurrently shorten the stopping distance of the vehicle.

An automotive antiskid control system of a vehicle includes antiskid condition determining means for determining whether or not each wheel reaches an antiskid control condition to perform an antiskid control during a brake operation of the vehicle, and antiskid controlling means for controlling a deceleration state of a wheel determined to have reached the antiskid control condition by adjusting a brake pressure of the wheel. In addition, the automotive antiskid control system has determining means for determining whether or not a road on which the vehicle is running is a road having a low coefficient of friction and control mode changing means for changing a control mode of the antiskid controlling means to a mode which strengthens a locking tendency of at least one wheel when the road is determined to be the low friction road by the determining means.

According to the above antiskid control system, when the vehicle is running on the low friction road, the antiskid control is executed so as to strengthen the locking tendency of at least one wheel. Most low friction roads in urban areas are composed of a "mottled road surface" with ice parts and asphalt parts as described above. Therefore, by strengthening the locking tendency of at least one wheel, the vehicle can be sufficiently decelerated on the asphalt parts. In consequence, the deceleration achieved accordingly on the visible asphalt parts can satisfy the expectation of a driver, and the driver can drive the vehicle exactly as the driver expects. Furthermore, while the locking tendency is strengthened, the antiskid control itself is executed. Therefore, there is no possibility of losing the steering stability on the low μ road.

As a result, according to the antiskid control system of the present invention, it is possible to secure the steering stability without failing to satisfy the expectation of the driver and concurrently shorten the stopping distance of the vehicle on the "mottled road surface" as often seen in urban areas.

Furthermore, the antiskid control system for a vehicle may have control mode changing means for changing a control mode of the antiskid controlling means to a mode which strengthens a locking tendency of at least one wheel after the brake pressure is adjusted by the antiskid controlling means for a predetermined period of time.

According to the antiskid control system described above, antiskid control according to a normal control mode is executed for a predetermined period of time and thereafter the locking tendency of at least one wheel is strengthened. If the antiskid control is executed for the predetermined period of time it can be presumed that the friction coefficient of the road surface is small. Therefore, when the road on which the vehicle is running is presumed to be a low friction road or, i.e. the "mottled road surface", the locking tendency of at least one wheel is strengthened. As a result, it is possible to secure the steering stability without failing to satisfy the expectation of the driver and concurrently shorten the stopping distance on the "mottled road surface".

Moreover, the antiskid control system may have control mode changing means for changing a control mode of the antiskid controlling means to a mode which strengthens a locking tendency of at least one wheel after a control cycle including a brake pressure increase and brake pressure reduction is executed for a predetermined number of times.

According to the antiskid control system described above, after a control cycle including a brake pressure increase and brake pressure reduction is executed for a predetermined number of times, the locking tendency of at least one wheel is strengthened. When the control cycle is executed for the predetermined number of times, it can be presumed that the friction coefficient of the road surface is small. Particularly in the "mottled road surface", as described above, a brake pressure reduction and a brake pressure increase are repeated. Therefore, whether or not the vehicle is running on the "mottled road surface" can exactly be presumed particularly by referring to the number of execution times of this control cycle.

As a result, the deceleration that can satisfy the expectation of the driver can be realized on the "mottled road surface", the steering stability due to the antiskid control can be secured, and the stopping distance of the vehicle can be shortened.

The stopping distance of the vehicle can also be shortened by not changing the antiskid control mode but by canceling the antiskid control. In this case, however, the wheel may be locked and therefore the steering stability obtained by the antiskid control may fail to be secured. In the present invention, the antiskid control is not canceled but the antiskid control mode is changed to secure the steering stability. Therefore, there is no possibility of losing the steering stability.

The antiskid control system may further have an operation speed limiting means for allowing the operating of the control mode changing means only when the vehicle running speed is a predetermined speed or less.

According to this antiskid control system, even if the road is a low friction road, unless the vehicle running speed is the predetermined speed or less, the control means changing means cannot change the control mode to the one which strengthens the locking tendency. Therefore, there is no possibility of excessively strengthening the locking tendency of the wheel when the vehicle running speed is high. A first priority is given to the steering stability that comes to be a concern particularly when the vehicle running speed is high. On the other hand, when the vehicle speed has been sufficiently decreased, the locking tendency of at least one wheel is strengthened. As a result, it is possible to make the effective use of the asphalt parts of the "mottled road surface."

As described above, in a range of high and medium speeds in which the securement of the steering stability is necessary, the normal antiskid control is executed to prevent the wheels from being locked. On the other hand, in a range of low speed in which the steering stability is not as great of a concern, it is possible to shorten the stopping distance by utilizing the "mottled road surface" characteristics.

The antiskid control system may have the control mode changing means change the only control modes of front wheels.

According to the antiskid control system described above, even if the road has the "mottled road surface", the normal antiskid control is executed with respect to rear wheels, and the changed antiskid control to strengthen the locking tendency is executed with respect to the only front wheels. Accordingly, as the rear wheels are hard to be locked, it is possible to control the side slip of the vehicle. Therefore, it is possible to exactly prevent the spin of the vehicle and concurrently apply the brakes utilizing the "mottled road surface" characteristics.

Furthermore, the antiskid control system may have the control mode changing means for changing control modes so that the locking tendency of either one of the front left wheel and the front right wheel is strengthened and the locking tendency of the other front wheel remains unstrengthened.

According to this antiskid control system, the locking tendency of only one of the front left wheel and the front right wheel is strengthened. Therefore, it is possible to shorten the stopping distance by the action and effect of one front wheel with stronger locking tendency. The steering performance of the steering wheel is maintained by the action and effect of the other front wheel with weaker locking tendency.

Moreover, the antiskid control system may have the control mode changing means for realizing the change of the control mode by increasing the brake pressure when the brake pressure should be reduced in the normal control mode.

According to this antiskid control system, when the brake pressure should be reduced in the normal antiskid control, e.g., when the vehicle is passing over an ice part of the "mottled road surface", the brake pressure is increased. As a result, the speed of the wheel passing over the ice part does not recover or the recover thereof is restricted, and the speed of the wheel passing through the ice part into an asphalt part is sufficiently lowered. That is, the locking tendency of the wheel has been strengthened. In this manner, it is possible to strengthen the locking tendency of the wheel more effectively by increasing the brake pressure instead of reducing it, and the deceleration on the asphalt parts can effectively be realized.

In the antiskid control system, the increase of the brake pressure is performed in a pulsed manner.

As a result, there is no possibility that the brake pressure is sharply increased under such a condition that the brake pressure should be reduced. Thus, the wheel is not completely locked. As a result, even if the road surface is not "mottled" but of a complete "icy road surface", the steering stability is not lost due to the sudden locking of the wheel.

In addition, the antiskid control system may have the control mode changing means for changing the control modes so that the locking tendency of the wheel gradually strengthens.

According to the antiskid control system described above, the locking tendency of the wheel becomes stronger as the vehicle speed falls. It should be noted here that the more the vehicle speed falls, the less the steering stability becomes important. Therefore, it is possible to raise the braking performance as the steering stability becomes less important and the braking effect can be maximized while the securement of the steering stability, which is the primary object of the antiskid control, is not disturbed.

Next, the antiskid control system may have the control mode changing means for changing the control modes so that the locking tendency is gradually strengthened by gradually lengthening a pressure increase period of time.

According to the antiskid control system the brake pressure increase period of time is gradually lengthened. The locking tendency of the wheel is gradually strengthened. As a result, it is possible to raise the braking performance as the steering stability becomes less important. As a result, the braking effect can be maximized while the securement of the steering stability, which is the primary object of the antiskid control, is not disturbed.

Moreover, the antiskid control system may have the control mode changing means for changing the control modes so that the locking tendency is strengthened by raising the target slip ratio of the antiskid control.

According to this antiskid control system, the locking tendency of the wheel is naturally strengthened by raising the target slip ratio. Accordingly, the antiskid control itself that the wheel slip ratio is adjusted to the target slip ratio can be performed and the braking performance on the "mottled road surface" can be secured by the gradually raised target slip ratio. As a result, the locking tendency is not excessively strengthened beyond the expectation of the driver.

Furthermore, the antiskid control system may have the control mode changing means for changing the control modes so that the target slip ratio is gradually raised.

In this case, it is possible to raise the braking performance as the steering stability becomes less important. As a result, the braking effect can be maximized while the securement of the steering stability, which is the primary object of the antiskid control, is not disturbed.

Finally, the antiskid control system may have the control mode changing means for changing the control modes by adjusting the brake pressure of a wheel having a stronger locking tendency so as to be equal to the brake pressure of a wheel having a weaker locking tendency. This is called "high select control" is executed.

When the "high select control" is executed, the brake pressures of all the wheels are adjusted to the brake pressure of the wheel which has the, weakest locking tendency. Therefore, the brake pressure of the wheel having a stronger locking tendency is adjusted so that it further increases. As a result, the locking tendency of the overall vehicle becomes stronger. The asphalt parts of the "mottled road surface" can effectively be utilized to raise the deceleration of the vehicle.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 9 is a time chart illustrating the results of the hydraulic control according to the second embodiment.

DETAILED DESCRIPTION OF THE PREFERRED EMBODIMENTS

Preferred embodiments of the present invention will be described in detail with reference to the attached figures.

Figure 1:
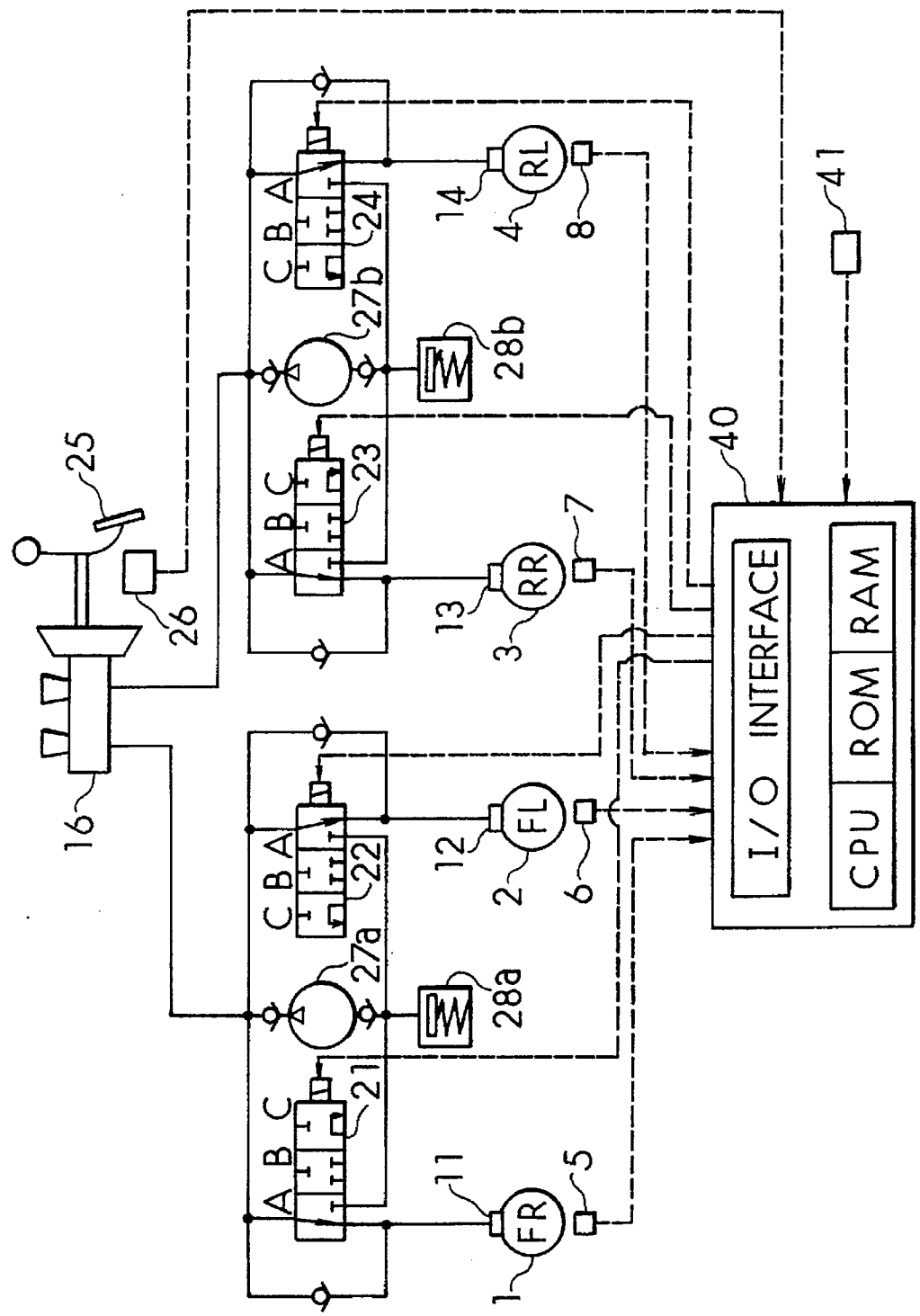
FIG. 1 is a schematic diagram illustrating the overall structure of an antiskid control system according to a first embodiment of the present invention.

FIG. 1 is a schematic diagram illustrating the overall structure of an antiskid controlling system according to a first embodiment to which the present invention is applied. This embodiment is an example of the application of the present invention to a vehicle of a front engine/rear drive (F/R).

As illustrated in FIG. 1, a front right wheel 1, a front left wheel 2, a rear right wheel 3 and a rear left wheel 4 are provided with rotational speed sensors 5, 6, 7 and 8, respectively, which generate pulse signals (rotational speed signals) according to the rotation speeds of the respective wheels 1 through 4. Rotational speed sensors 5 through 8 can employ electromagnetic type sensors, magnetic resistance type sensors and so on.

These wheels 1 through 4 are provided with wheel cylinders 11, 12, 13 and 14, respectively. These wheel cylinders 12 through 14 operate hydraulic brake systems (not illustrated) by using fluid pressure supplied from a master cylinder 16. The fluid pressure from the master cylinder 16 is sent to the respective wheel cylinders 11 through 14 through actuators 21, 22, 23 and respectively. The fluid pressure from the master cylinder 16 is increased or decreased according to the amount of depression of a brake pedal 25 depressed by a driver. This brake pedal 25 is provided with a top switch 26 which detects the depression state of the brake pedal 25 and outputs on "ON" signal when the brake is in the applied state or an "OFF" signal when the brake is in the released state.

Each of the above actuators 21 through 24 is an electromagnetic three-position valve. When not electrically energized, these actuators 21 through 24 are controlled to the illustrated states (positions A), respectively. On the other hand, when electrically energized, these actuators 21 through 24 are switched to positions B or C.

When the actuators 21 through 24 are in the respective positions A, the master cylinder 16 is communicated with the wheel cylinders 11 through 14, respectively. In this state, the brake fluid pressures of the wheel cylinders 11 through 14 are in one-to-one correspondence respectively with the increase or decrease in the fluid pressure of the master cylinder 16. Accordingly, when the brake is in the applied state, the brake fluid pressures of wheel cylinders 11 to 14 in correspondence with the fluid pressure of the master cylinder 16.

On the other hand, when the actuators 21 through 24 are repositioned to the respective positions B, the respective brake fluids cannot flow in or out of the wheel cylinders 11 through 14. That is, a pressure hold mode for holding the brake fluid pressure is executed. Furthermore, when the actuators 21 through 24 are repositioned to the respective positions C, the brake fluids flow out of the wheel cylinders 11 through 14 into reservoirs 28a and 28b. This is, a pressure reduction mode for reducing the brake fluid pressure is executed.

The brake fluid stored in the reservoirs 28a and 28b is returned to the master cylinder 16 by hydraulic pumps 27a and 27b. As a result, the brake fluid pressure can be increased immediately after the pressure increase mode is started.

Mode change control which controls the respective actuators 21 through 24 to any one of the pressure increase mode, pressure reduction mode and pressure hold mode is executed by an electronic control circuit 40. The electronic control circuit 40 is composed of a microcomputer which is further composed of a CPU, a ROM, a RAM, an I/O interface, etc. When an ignition switch 41 is turned on, the electronic control circuit 40 starts its operation with the supply of electric power. The electronic control circuit 40 receives signals from the rotational speed sensors 5 through 8 for the respective wheels 1 through 4 and also from the stop switch 26. Upon receiving the signals from the rotational speed sensors 5 through 8 and the stop switch 26, the electronic control circuit 40 performs an operational processing for the control of the braking force based on these signals. Electronic control circuit 40 controls the valve positions of the respective actuators 21 through 24 based on the result of the operational processing.

Referring to flow charts in FIGS. 2 and 3, operational processing to be executed by the above electronic control circuit 40 will be described hereinafter.

Figure 2:
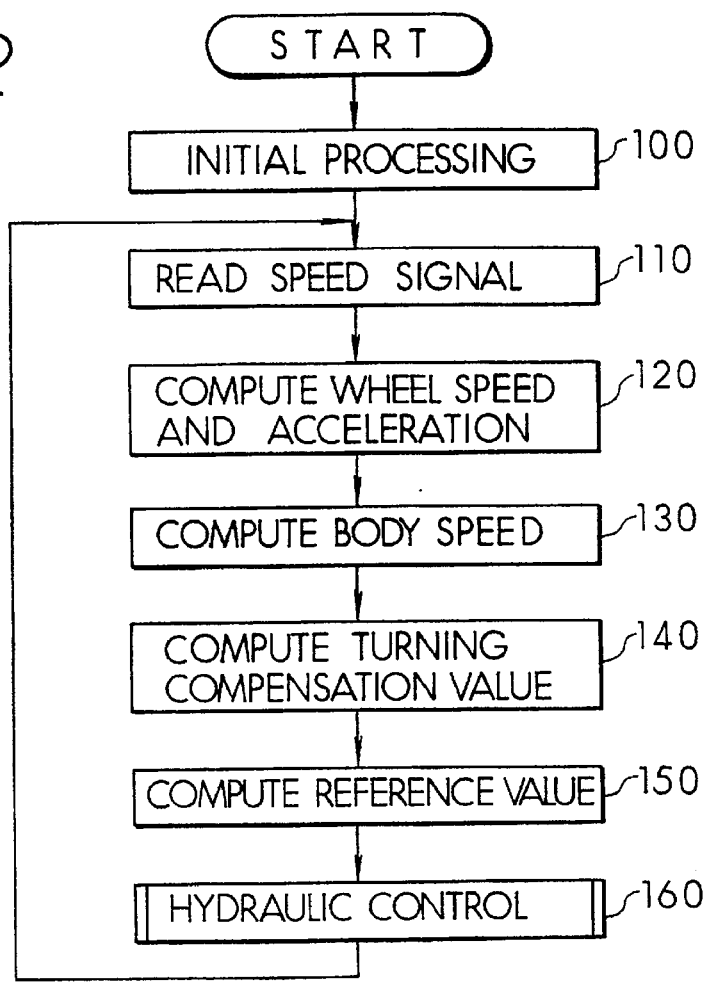
FIG. 2 is a flow chart illustrating the processing contents of a main routine to be executed by an electronic control circuit.
Figure 3:
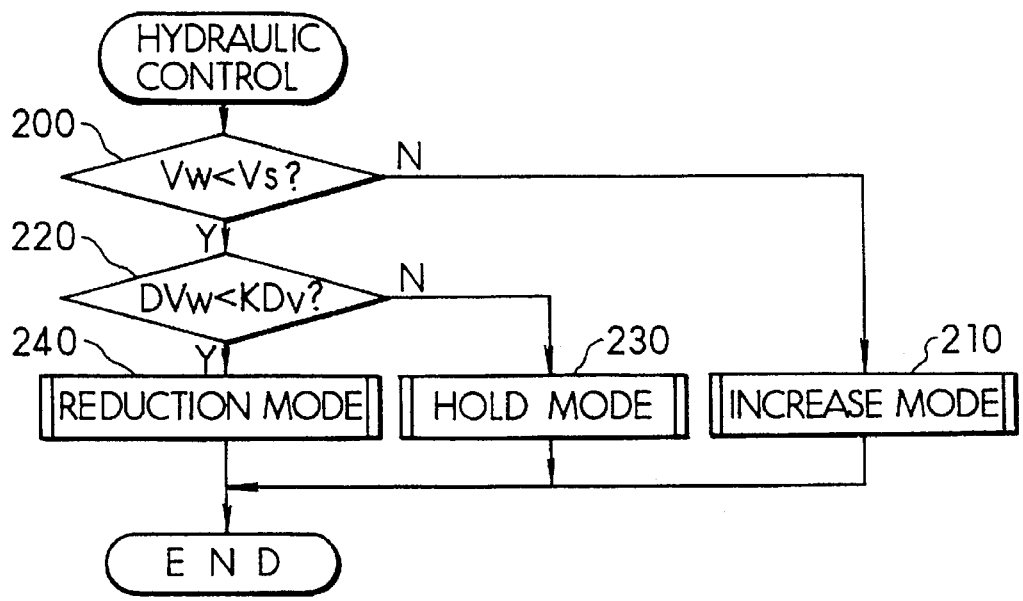
FIG. 3 is a flow chart illustrating the hydraulic control process to be executed in the step 160 of FIG. 2.

FIG. 2 illustrates the processing contents of the main routine.

As illustrated in FIG. 2, when the ignition switch 41 is turned on, the initialization processing such as memory clearance and flag resetting are executed (step 100). Then, rotational speed signals from the respective rotational speed sensors 5 through 8 are read in (step 110). Following this, based on the read rotational speed signals, the rotational speeds of the respective wheels 1 through 4 (hereinafter called "wheel speeds") $V_{WFR}$, $V_{WFL}$, $W_{WRR}$, and $W_{WRL}$ and rotational accelerations of the respective wheels 1 through 4 (hereinafter called "wheel accelerations") $DV_{WFR}$, $DV_{WFL}$, $DV_{WRR}$, and $DV_{WRL}$ which are differential values of the wheel speeds $V_{WFR}$ through $V_{WRL}$ (step 120) are computed. Here, the subscripts FR, FL, RR and RL affixed to the respective wheel speeds $V_N$ and wheel accelerations $DV_W$ represent the values of the front right wheel 1, front left wheel 2, rear right wheel 3 and rear left wheel 4, respectively. Hereinafter, these subscripts are affixed to those values which are obtained for the respective wheels 1 through 4.

Next, based on the maximum speed $V_{Wmax}$ of all the wheel speeds $V_{WFR}$ through $V_{WRL}$ of the respective wheels 1 through 4, an estimated body speed $V_B$ is computed (step 130).

The above processing is executed by the conventionally well-known steps. For example, to obtain the estimated body speed $V_B$, it is determined whether or not the maximum speed $V_{Wmax}$ of all the wheel speeds $V_{WFR}$ through $V_{WRL}$ of the respective wheels 1 through 4 is within a range from an acceleration limit value V α which was obtained by adding a predetermined value to the previously obtained estimated body speed $V_{B(n-1)}$ to a deceleration limit value V β which was obtained by subtracting another predetermined value from the estimated body speed $V_{B(n-1)}$; if the maximum speed $V_{Bmax}$ is within the range from the acceleration limit value V α to the deceleration limit value V β, the maximum speed $V_{Wmax}$ is set as the estimated body speed $V_B$; if the maximum speed $V_{Wmax}$ is above the acceleration limit value V α, this acceleration limit value V α is set as the estimated body speed $V_B$; and if the maximum speed $V_{Wmax}$ is below the deceleration limit value V β, this deceleration limit value V β is set as the estimated body speed $V_B$.

After obtaining the estimated body speed $V_B$ as described above, turning compensation values $\Delta V_{WOFR}$, $\Delta V_{WOFL}$, $\Delta V_{WORR}$ and $\Delta V_{WORL}$ are computed which are used for setting the control reference values to determine the slip ratio of the respective wheels 1 through 4 (step 140).

These turning compensation values $\Delta V_{WOFR}$ through $\Delta V_{WORL}$ are values set to compensate for the deviations of the body speeds in mounted positions of the respective wheels 1 through 4 from the estimated body speeds $V_B$ obtained in the above step 130 when the vehicle is in turning. In this embodiment, these values are set by obtaining the deviations of the wheel speed $V_{WRL}$ of the rear left wheel 3 or wheel speed $V_{WRR}$ of the rear right wheel 4, whichever larger value $V_{WRmax}$, from the wheel speeds $V_{WFR}$ through $V_{WRL}$ of the respective wheels 1 through 4 when the stop switch 26 outputs the "OFF" signal, i.e., when the brake is not in the applied state. This can be reiterated as follows:

When the brake is not in the applied state, the wheel speeds $V_{WFR}$ through $V_{WRL}$ of the respective wheels 1 through 4 are almost equal to the body speed at the respective wheel mounted positions, and the wheel speeds of the respective inside turning wheels are lower than those of the respective outside turning wheels when the vehicle is in turning. Therefore, in the step 140, the deviations of the wheel speeds $V_{WFR}$ through $V_{WRL}$ of the respective wheels 1 through 4 from the wheel speed of the rear left wheel 3 $V_{WRL}$ or wheel speed of the rear right wheel 4 $V_{WRR}$, whichever larger value $V_{WRmax}$, are obtained, then the deviation of body speed in each wheel position is obtained according to the turning angle of the vehicle immediately before the brake is applied, and then these deviations are set as the turning compensation values $\Delta V_{WOFR}$ through $\Delta V_{WORL}$ of the respective wheels 1 through 4.

After the turning compensation values $\Delta V_{WOFR}$ through $\Delta V_{WORL}$ of the respective wheels 1 through are obtained, the control reference values $V_{WOFR}$, $V_{WOF}$, $V_{WORR}$ and $V_{WORL}$ corresponding to the body speeds in the respective mounted positions of the respective wheels 1 through 4 are computed by subtracting the turning compensation values $\Delta V_{WOFR}$ through $\Delta V_{WORL}$ from the estimated body speed $V_B$ (step 150).

Following the above, slip conditions when the vehicle is in the brake applied state are determined for the respective wheels 1 through 4 based on the control reference values $V_{WOFR}$ through $V_{WORL}$ of the respective wheels 1 through 4, the wheel speeds $V_{WFR}$ through $V_{WRL}$ of the respective wheels 1 through 4, and the wheel accelerations $DV_{WFR}$ through $DV_{WRL}$ of the respective wheels 1 through 4. The hydraulic control processing are executed to control the brake fluid pressure, and the process returns to the step 110 (step 160).

Next, the hydraulic control processing executed for the wheels 1 through 4 respectively in the above step 160 will be described along the flow chart in FIG. 3. Here, as exactly the same hydraulic control processing is executed for all the wheels 1 through 4 in the step 160, hereinafter only the hydraulic control processing to be executed for any one of the wheels 1 through 44 will be described. Also hereinafter, the subscripts FR through RL will be omitted.

Figure 5A:
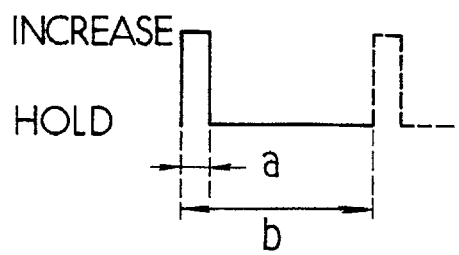
FIG. 5A is a descriptive view illustrating the normal pressure increase output.

The hydraulic control processing is executed when the stop switch 26 outputs the "ON" signal, i.e., when the vehicle is in the braked state. When the hydraulic control processing starts, it is determined whether or not the wheel speed $V_W$ is lower than the speed $V_S$ corresponding to the target slip ratio (step 200). When $V_W \geq V_S$, it can be interpreted that the wheel is in rotation with a slip ratio lower than the target slip ratio. Therefore the pressure increase mode is executed (step 210). In this pressure increase mode, simple brake pressure increase is instructed from the moment when the stop switch 26 is turned on until $V_W<V_S$ is established for the first time. As a result, the brake pressure rises according to the amount of the depression of the brake pedal. After $V_W<V_S$ is established, i.e., after the antiskid control starts, as illustrated in FIG. 5(A), a pressure increase pulse signal with a cycle "b" and a duty ratio "a/b" is output. Thus, the brake pressure gradually rises in the pressure increase mode.

On the other hand, when $V_W<V_S$, another determination is made whether or not the wheel acceleration $DV_W$ is lower than a predetermined reference deceleration KDV, i.e., whether or not the wheel is in deceleration with a deceleration higher than the reference deceleration KDV (step 220).

When the determination is "NO" in the step 220, i.e., when $DV_W \geq KDV$, it can be determined that the wheel holds the road and there is no possibility of occurrence of excessive slip. Therefore, the pressure hold mode is executed to keep the brake pressure unchanged (step 230).

Figure 4:
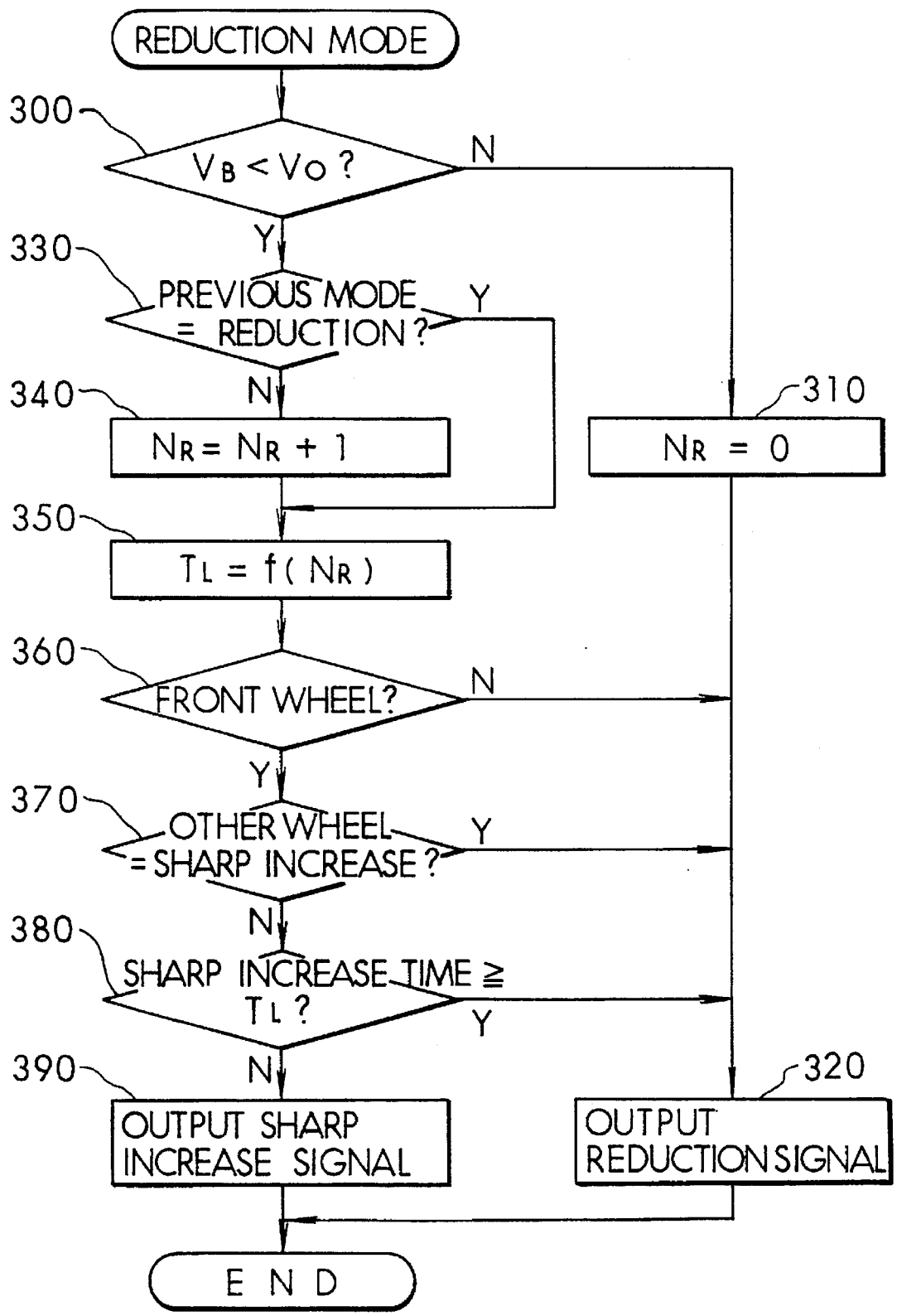
FIG. 4 is a flow chart illustrating the pressure reduction mode process to be executed in the step 240 of FIG. 3.

On the other hand, when the determination is "YES" in the step 220, i.e., when $DV_W<KDV$, the pressure reduction mode is executed (step 240). In this pressure reduction mode, process illustrated in FIG. 4 is executed.

In the pressure reduction mode, a determination is made whether or not the estimated body speed $V_B$ is lower than a predetermined reference speed $V_o$ (step 300). When $V_B \geq V_o$, the number of pressure reduction mode executions $N_R$ is cleared (step 310), and a specified pressure reduction signal is output (step 320).

On the other hand, when $V_B<V_o$, a determination is made whether or not the previous mode was the pressure reduction mode (step 330). Only when the previous mode was not the pressure reduction mode, the number of pressure reduction mode executions $N_R$ is incremented (step 340), i.e., when the mode is changed from the pressure increase mode or pressure hold mode to the pressure reduction mode, the number of pressure reduction mode execution times $N_R$ is incremented. When the previous mode was the pressure reduction mode, the step 340 is omitted. The steps 330 and 340 are steps for detecting how many control cycles have been executed since $V_B<V_o$ was established.

Figure 5B:
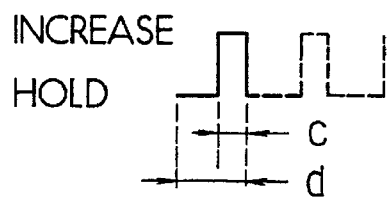
FIG. 5B is a descriptive view illustrating the pressure increase output by hydraulic sharp increase control.

After passing through the steps 330 and 340, the time TL required for hydraulic sharp increase output is calculated (step 350). Here, as illustrated in FIG. 5(B), the hydraulic sharp increase output is given as a pulse output with a cycle "d" and a duty ratio "c/d". This duty ratio "c/d" is larger than the duty ratio "a/b" of the normal pressure increase pulse ("c/d" >"a/b"). The time TL is a period of time during which the hydraulic sharp increase output is continued, and can be obtained from a map illustrated in FIG. 6. According to this map, TL=0 until the pressure reduction mode is executed for N1 time, and subsequently becomes longer in proportion to $N_R$ during a period of time from N1 time to N2 time, and TL=(fixed) after N2 time.

After the time TL is obtained, a determination is made whether the wheel which is an object of the antiskid control at present is a front wheel or a rear wheel (step 360). When the object wheel is not a front wheel, the pressure reduction signal is output (step 320). When the object wheel is a front wheel, however, a determination is made whether or not the other front wheel is in hydraulic sharp increase control (step 370). In this determination, when the other front wheel is in hydraulic sharp increase control, the process proceeds to the pressure reduction process (step 320), i.e., when the other front wheel is in hydraulic sharp increase control, the hydraulic sharp increase control is not executed and the pressure reduction signal is output. On the other hand, when the other front wheel is not in hydraulic sharp increase control, another determination is made whether or not the time TL has elapsed (step 380). When the time TL has not yet elapsed, the hydraulic sharp increase signal with a duty ratio of "c/d" is output (step 390).

Accordingly, only when $V_B<V_o$ and the object wheel is a front wheel and the other front wheel is not in hydraulic sharp increase control, locking tendency is strengthened by means of hydraulic sharp increase control over the time TL.

Now, the mode of operation and effect of the first embodiment will be described by using a time chart illustrated in FIG. 7.

Figure 7:
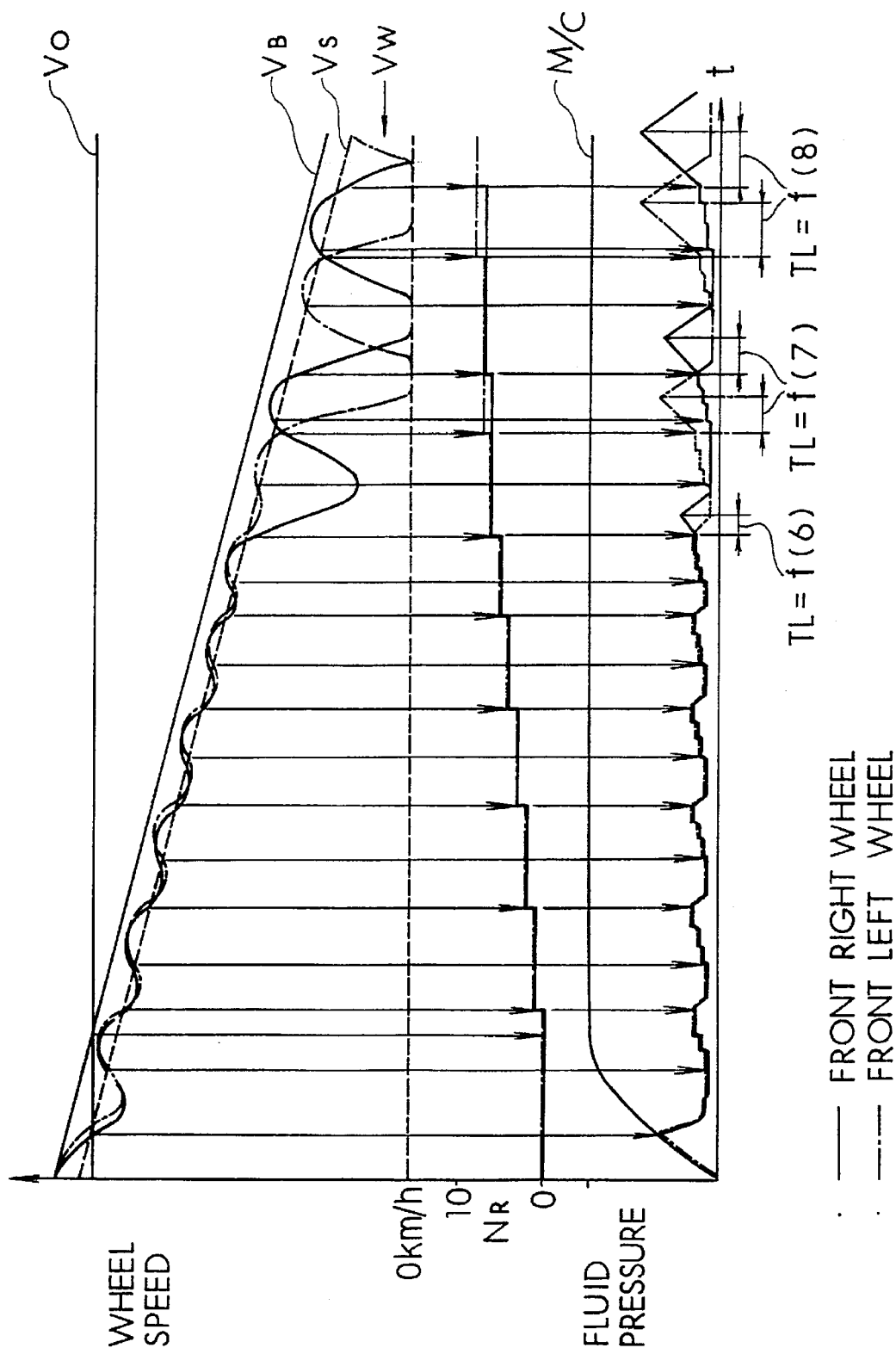
FIG. 7 is a time chart illustrating the results of the hydraulic control according to the first embodiment.
Figure 8:
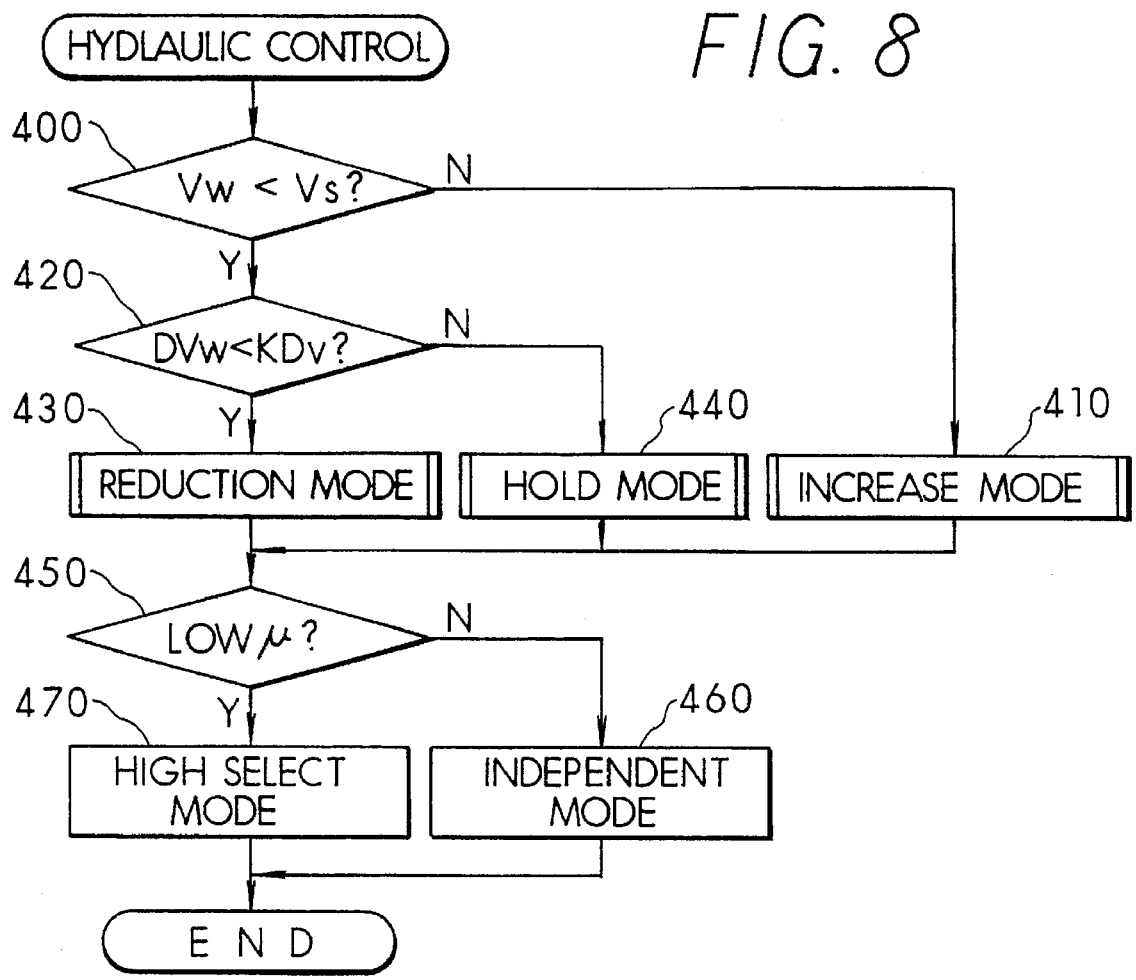
FIG. 8 is a flow chart illustrating of the hydraulic control process according to the second embodiment.
Figure 10:
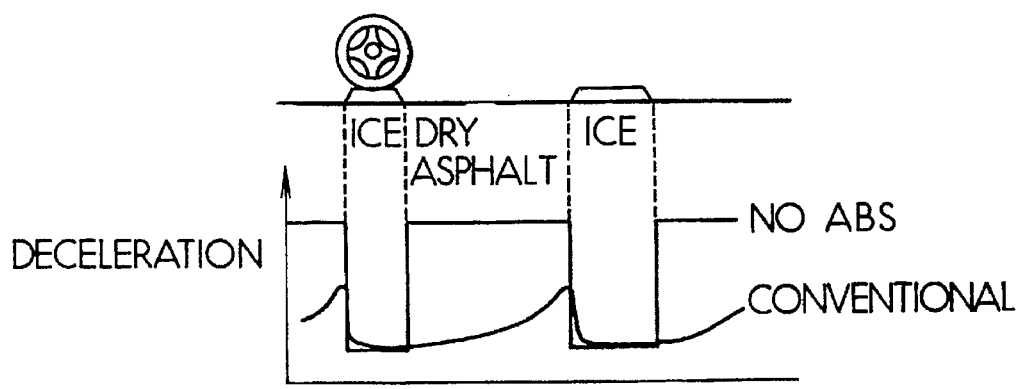
FIG. 10 is a descriptive view illustrating a problem with the prior art.

As illustrated in FIG. 7, when the vehicle is braked and the antiskid control is started, hydraulic increase and reduction is repeated so that the front wheel speeds $V_{WFR}$ and $V_{WFL}$ can be converged to the target wheel speed $V_S$ corresponding to the target slip ratio of 20% with respect to the estimated wheel speed $V_B$. This hydraulic increase and reduction is so controlled that the pressure reduction can quickly be executed and the pressure increase can slowly be executed.

Figure 6:
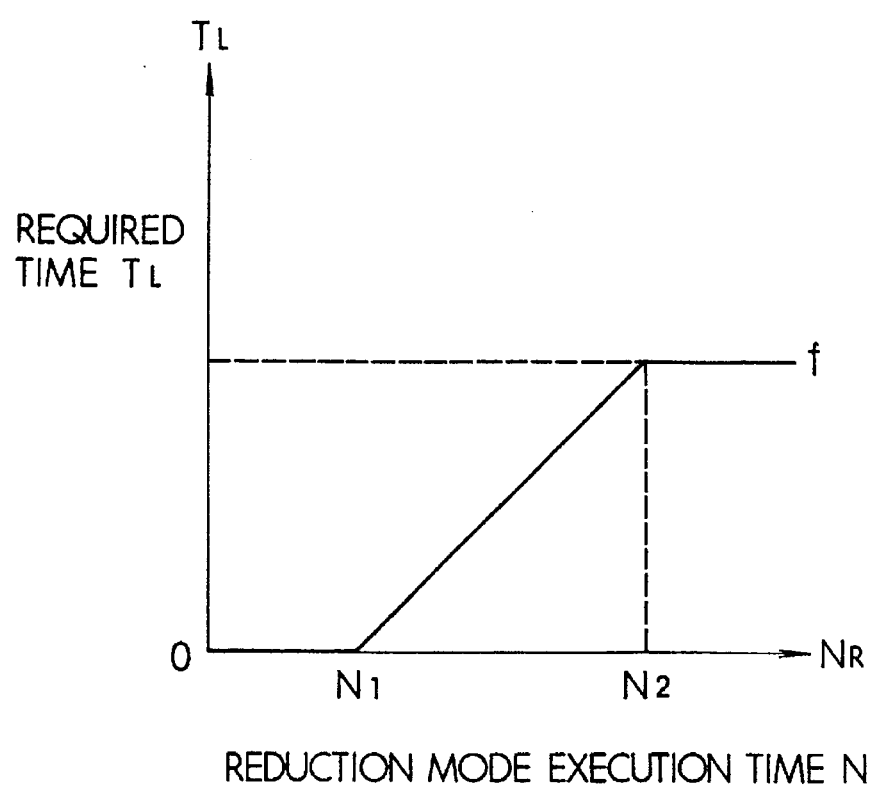
FIG. 6 is a map illustrating the relation between the number of pressure reduction mode execution times and the required time for pressure increase output.

When the estimated body speed $V_B$ becomes lower than the reference speed $V_o$, the count-up of the number of pressure reduction mode execution times $N_R$ is started. FIG. 7 illustrates an example where N1 in the map in FIG. 6 is set to 5 times. When the number of pressure reduction mode execution times $N_R=1$ to 5, the same control as that when the body speed is higher than $V_o$ is repeated.

On the other hand, when $N_R=6$, hydraulic sharp increase control is started. In this example, as the wheel speed of the front right wheel $V_{WFR}$ quickly drops, hydraulic sharp increase control is executed only for the front right wheel. As the hydraulic sharp increase control is executed only for one of the front wheels due to the processing in the step 370, even when $N_R=6$, the same pressure reduction as before is executed for the front left wheel.

The hydraulic sharp increase control is executed over the time TL=f(6) obtained from the map in FIG. 6, the wheel speed of the front right wheel $V_{WFR}$ is greatly reduced. When the time TL has elapsed, the reduction of the brake fluid pressure is now executed (step 320). When the deceleration of the wheel speed exceeds the reference deceleration KDV, the mode changes to the pressure hold mode (step 230). Subsequently, when the wheel speed $V_{WFR}$ exceeds the target wheel speed $V_S$, the mode changes to the pressure increase mode (step 210), and the brake fluid pressure slowly rises.

Through the above steps, the wheel speed $V_{WFL}$ of the front left wheel falls below the target wheel speed $V_S$ again, whereby the number of pressure reduction mode execution times $N_R$ becomes 7, and the hydraulic sharp increase control is executed for the front left wheel. As the time TL required for hydraulic sharp increase control becomes the time f(7) corresponding to NR=7, the brake fluid pressure is increased for a time longer compared with the hydraulic sharp increase control for the front right wheel previously executed. As a result, the front left wheel is locked once according to the example in this figure.

With respect to the front right wheel, NR=7 is established with timing slightly behind the front left wheel, and the mode changes to the pressure reduction mode, and thereby the hydraulic sharp increase control is executed for a period of time corresponding to TL=f(7).

Following this, the hydraulic sharp increase control is alternatingly repeated for the front left wheel and then for the front right wheel.

As a result of the above, according to the first embodiment, either of the front left wheel or the front right wheel tends to be locked more strongly than the other front wheel. Therefore, on the surface of a road mottled with ice parts and asphalt parts, even if the slip ratio is high on the ice part, one of the front left wheel and the front right wheel is controlled to the state where the locking tendency thereof is more strongly than that of the other front wheel by the hydraulic sharp increase control. Accordingly, the deceleration on the asphalt part can sufficiently be achieved. Furthermore, in this case, as the hydraulic sharp increase control is not executed for the other front wheel, there is no possibility that both the front left wheel and the front right wheel are simultaneously locked. Accordingly, either of the front wheels can follow the steering operation of the steering wheel and therefore there is no possibility of losing steering stability.

In case of a road overall surfaced with a dry asphalt, which is not "mottled", as there is no cause of slip like an ice part, the vehicle stops before the pressure reduction timing comes for as many as 6 times after the body speed $V_B$ falls below the reference speed $V_o$ in many cases. Accordingly, on the dry asphalt surface of a road, the vehicle can exactly be stopped only by the normal antiskid control irrespective of the above hydraulic sharp increase control. Another purpose of starting the hydraulic sharp increase control from $N_R$=6 in setting the map of FIG. 6 in this embodiment as described above is to distinguish whether or not the vehicle is running on a low μ road (particularly a "road with mottled surface") for which the hydraulic sharp increase control is necessary and on which the hydraulic sharp increase control effectively works.

The second embodiment according to the present invention will now be described.

The second embodiment is different from the first embodiment in the contents of the hydraulic control routine.

In the second embodiment, when $V_W \geq V_S$, the pressure increase mode is executed (step 400→step 410), when $V_W < V_S$ and $DV_W < KDV$, the pressure reduction mode is executed (step 400→step 420→step 430), and in any other case, the pressure hold mode is executed (step 400→step 420→step 440). There has so far been no change in the hydraulic control routine from the conventional antiskid control.

In the hydraulic control routine according to the second embodiment, however, a determination is made whether or not the road is a low μ road with a small coefficient of road surface friction (step 450). When the road is not a low μ road, the front wheels are independently controlled (step 460), and when the road is a low μ road, the front wheels are controlled according to a front high select mode (step 470). Here, the "front high select mode" is a mode in which either one of the front left wheel and the front right wheel having a larger locking tendency is controlled in the same control mode according to the control state of the other front wheel having a weaker locking tendency.

Therefore, for example, even if the front left wheel should originally be in the pressure reduction mode, when the front right wheel is in the pressure increase mode, the front left wheel is forced to be controlled in the pressure increase mode. As a result, even if either of the front wheels is in the normal control state, the other front wheel is in the control state with a stronger locking tendency. Particularly, when either of the front wheels has a stronger locking tendency on a road mottled with asphalt parts and ice parts, the locking tendency of this front wheel is further strengthened under the influence of the other front wheel. Accordingly, when the front wheel having a stronger locking tendency comes to an asphalt part, this front wheel is exactly decelerated by the asphalt, and thereby the brake performance of the vehicle on the "mottled road surface" can be improved.

According to each of the embodiments described above, in the urban road surface state in the winter season mottled with asphalt parts and ice parts, the deceleration performance owing to the asphalt parts can adequately be used, and the vehicle can be braked with a sense of braking of the driver which matches the road condition visually understood by the driver. As a result, the driver can depress the brake pedal with no sense of incongruity, and moreover the stopping distance of the vehicle can be shortened.

Furthermore, as only the front wheels are provided with the hydraulic sharp increase control or the high select control, the rear wheels do not fail to be protected from being locked as ever before, there is no occurrence of spin or the like. In addition, as only one of the front wheels has a stronger locking tendency, there is no possibility that both the front left wheels and the front right wheels are simultaneously locked, and there is no possibility of losing the steering stability until the vehicle stops.

Although the first and second embodiments have been described above, it should be apparent that the present invention is not limited to these embodiments but may be embodied in many other forms without departing from the spirit or the scope of the present invention.

For example, as illustrated in FIG. 9, on a low μ road ("mottled road surface") on which the pressure reduction mode comes for many times even if after $V_B < V_o$ is established, the line of the target wheel speed $V_S$ may be changed by gradually raising the target slip ratio instead of changing the hydraulic control conditions. In this case, the braking performance can be secured on the "mottled road surface" without disturbing the antiskid control itself that the wheel slip ratio is adjusted to the target slip ratio. Particularly, excessive locking tendency beyond the expectation of the driver can easily be prevented. In addition, as the target slip ratio is gradually increased, it is possible to raise the braking performance as the steering stability becomes less important. The braking effect can be maximized while realizing the securement of the steering stability, which is the primary object of the antiskid control. In this case, it goes without saying that the target wheel acceleration may be changed so that the slip ratio can increase according to the change in the target wheel speed $V_S$.

Furthermore, in the above embodiments, when the number of the pressure reduction mode execution times $N_R$ exceeds 5, the hydraulic sharp increase control is executed. However, it is also acceptable that the hydraulic sharp increase control is executed when a specified time elapsed after the estimated body speed $V_B$ falls below the reference speed $V_o$. The hydraulic sharp increase control is applied to both the front left wheel and the front right wheel at the same time or to all the four wheels. The reason for the acceptance of these modifications is that when all the four wheels are locked on the "mottled road surface," the braking performance can effectively be raised and the wheels can be decelerated to a low speed. Therefore there is little possibility that the wheels are enslaved by spins or the steering stability is lost.

What is claimed is:

1. An antiskid control system of a vehicle including antiskid condition determining means for determining whether or not each wheel reaches an antiskid control condition at which antiskid control is performed during a brake operation, and antiskid controlling means for controlling a deceleration state of a wheel determined to reach the antiskid control condition by adjusting a brake fluid pressure of the wheel, comprising:

determining means for determining whether or not the vehicle is running on a low friction road which has a low coefficient of friction; and control mode changing means for changing a control mode of said antiskid controlling means to a mode which strengthens a locking tendency of at least one wheel when the vehicle is running on the low friction road, wherein said antiskid controlling means executes the antiskid control according to an unchanged control mode when the vehicle is running on the road which has a friction coefficient greater than said low coefficient of friction.

2. An antiskid control system according to claim 1, further comprising speed limiting means for allowing the operation of said control mode changing means only when a vehicle running speed is equal to or lower than a predetermined speed.

3. An antiskid control system according to claim 1, wherein said control mode changing means changes the control mode of only front wheels.

4. An antiskid control system according to claim 3, wherein said control mode changing means changes the control modes so that the locking tendency of either one of a front left wheel and a front right wheel is strengthened and the locking tendency of another front wheel remains unstrengthened.

5. An antiskid control system according to claim 4, wherein said control mode changing means changes the control modes so that the locking tendencies of the front left wheel and the front right wheel are strengthened sequentially.

6. An antiskid control system according to claim 1, wherein the control mode is changed in a manner that the locking tendency is strengthened by increasing the brake fluid pressure when the brake fluid pressure should be reduced in a normal control mode.

7. An antiskid control system according to claim 6, wherein the increase of the brake fluid pressure is performed in a pulsed manner.

8. An antiskid control system according to claim 1, wherein said control mode changing means changes the control modes so that the locking tendency of the wheel is gradually strengthened.

9. An antiskid control system according to claim 8, wherein said control mode changing means changes the control modes so that the locking tendency of the wheel is gradually strengthened by gradually lengthening a pressure increase period of time in the case where the locking tendency of the wheel is strengthened by increasing the brake fluid pressure when the brake fluid pressure should be reduced in a normal control mode.

10. An antiskid control system according to claim 1, wherein said control mode changing means changes the control modes so that the locking tendency is strengthened as a result that said antiskid controlling means raises a target slip ratio of the antiskid control.

11. An antiskid control system according to claim 10, wherein said antiskid controlling means gradually raises the target slip ratio of the antiskid control.

12. An antiskid control system according to claim 1, wherein said control mode changing means changes the control modes by adjusting the brake fluid pressure of a wheel having a stronger locking tendency so as to be equal to the brake pressure of a wheel having a weaker locking tendency.

13. An antiskid control system for a vehicle including antiskid condition determining means for determining whether or not each wheel reaches an antiskid control condition to perform an antiskid control during a brake operation, and antiskid controlling means for controlling a deceleration state of a wheel determined to reach the antiskid control condition by adjusting a brake fluid pressure of the wheel, comprising:

measuring means for measuring a period of time that said antiskid controlling means adjusts the brake fluid pressure of the wheel;

control mode changing means for changing a control mode of said antiskid controlling means to a mode which strengthens a locking tendency of at least one wheel when the period of time measured by said measuring means exceeds a predetermined period of time.

14. An antiskid control system according to claim 13, further comprising speed limiting means for allowing the operation of said control mode changing means only when a vehicle running speed is equal to or lower than a predetermined speed.

15. An antiskid control system according to claim 13, wherein said control mode changing means changes the control mode of only front wheels.

16. An antiskid control system according to claim 15, wherein said control mode changing means changes the control modes so that the locking tendency of either one of a front left wheel and a front right wheel is strengthened and the locking tendency of another front wheel remains unstrengthened.

17. An antiskid control system according to claim 16, wherein said control mode changing means changes the control modes so that the locking tendencies of the front left wheel and the front right wheel are strengthened sequentially.

18. An antiskid control system according to claim 13, wherein the control mode is changed in a manner that the locking tendency is strengthened by increasing the brake fluid pressure when the brake fluid pressure should be reduced in a normal control mode.

19. An antiskid control system according to claim 18, wherein the increase of the brake fluid pressure is performed in a pulsed manner.

20. An antiskid control system according to claim 13, wherein said control mode changing means changes the control modes so that the locking tendency of the wheel is gradually strengthened.

21. An antiskid control system according to claim 20, wherein said control mode changing means changes the control modes so that the locking tendency of the wheel is gradually strengthened by gradually lengthening a pressure increase period of time in the case where the locking tendency of the wheel is strengthened by increasing the brake fluid pressure when the brake fluid pressure should be reduced in a normal control mode.

22. An antiskid control system according to claim 13, wherein said control mode changing means changes the control modes so that the locking tendency is strengthened as a result that said antiskid controlling means raises a target slip ratio of the antiskid control.

23. An antiskid control system according to claim 22, wherein said antiskid controlling means gradually raises the target slip ratio of the antiskid control.

24. An antiskid control system according to claim 13, wherein said control mode changing means changes the control modes by adjusting the brake fluid pressure of a wheel having a stronger locking tendency so as to be equal to the brake pressure of a wheel having a weaker locking tendency.

25. An antiskid control system for a vehicle including antiskid condition determining means for determining whether or not each wheel reaches an antiskid control condition to perform an antiskid control during a brake operation, and antiskid controlling means for controlling a deceleration state of a wheel determined to reach the antiskid control condition by adjusting a brake fluid pressure of the wheel, comprising:

counting means for counting a number of times that said antiskid controlling means executes control cycle including a brake pressure increase and a brake pressure reduction;

control mode changing means for changing a control mode of said antiskid controlling means to a mode which strengthens a locking tendency of at least one wheel when the number of times counted by said counting means exceeds a predetermined number of times.

26. An antiskid control system according to claim 25, further comprising speed limiting means for allowing the operation of said control mode changing means only when a vehicle running speed is equal to or lower than a predetermined speed.

27. An antiskid control system according to claim 25, wherein said control mode changing means changes the control mode of only front wheels.

28. An antiskid control system according to claim 27, wherein said control mode changing means changes the control modes so that the locking tendency of either one of a front left wheel and a front right wheel is strengthened and the locking tendency of another front wheel remains unstrengthened.

29. An antiskid control system according to claim 28, wherein said control mode changing means changes the control modes so that the locking tendencies of the front left wheel and the front right wheel are strengthened sequentially.

30. An antiskid control system according to claim 25, wherein the control mode is changed in a manner that the locking tendency is strengthened by increasing the brake fluid pressure when the brake fluid pressure should be reduced in a normal control mode.

31. An antiskid control system according to claim 30, wherein the increase of the brake fluid pressure is performed in a pulsed manner.

32. An antiskid control system according to claim 25, wherein said control mode changing means changes the control modes so that the locking tendency of the wheel is gradually strengthened.

33. An antiskid control system according to claim 32, wherein said control mode changing means changes the control modes so that the locking tendency of the wheel is gradually strengthened by gradually lengthening a pressure increase period of time in the case where the locking tendency of the wheel is strengthened by increasing the brake fluid pressure when the brake fluid pressure should be reduced in a normal control mode.

34. An antiskid control system according to claim 25, wherein said control mode changing means changes the control modes so that the locking tendency is strengthened as a result that said antiskid controlling means raises a target slip ratio of the antiskid control.

35. An antiskid control system according to claim 34, wherein said antiskid controlling means gradually raises the target slip ratio of the antiskid control.

36. An antiskid control system according to claim 25, wherein said control mode changing means changes the control modes by adjusting the brake fluid pressure of a wheel having a stronger locking tendency so as to be equal to the brake pressure of a wheel having a weaker locking tendency.

* * * * *